(12) United States Patent
Krebs et al.

(10) Patent No.: US 9,760,847 B2
(45) Date of Patent: Sep. 12, 2017

(54) TENANT SELECTION IN QUOTA ENFORCING REQUEST ADMISSION MECHANISMS FOR SHARED APPLICATIONS

(71) Applicant: SAP SE, Walldorf (DE)

(72) Inventors: Rouven Krebs, Weingarten (DE); Arpit Mehta, Karlsruhe (DE)

(73) Assignee: SAP SE, Walldorf (DE)

( * ) Notice: Subject to any disclaimer, the term of this patent is extended or adjusted under 35 U.S.C. 154(b) by 448 days.

(21) Appl. No.: 13/904,729

(22) Filed: May 29, 2013

(65) Prior Publication Data

US 2014/0358620 A1    Dec. 4, 2014

(51) Int. Cl.
| | | |
|---|---|---|
| *G06Q 10/06* | (2012.01) | |
| *G06F 9/50* | (2006.01) | |
| *H04L 12/24* | (2006.01) | |

(52) U.S. Cl.
CPC ..... *G06Q 10/06315* (2013.01); *G06F 9/5072* (2013.01); *G06F 2209/5013* (2013.01); *G06F 2209/5021* (2013.01); *H04L 41/5009* (2013.01); *H04L 41/5025* (2013.01)

(58) Field of Classification Search
None
See application file for complete search history.

(56) References Cited

U.S. PATENT DOCUMENTS

| | | | |
|---|---|---|---|
| 8,037,187 B2 | 10/2011 | Dawson et al. | |
| 8,347,306 B2 | 1/2013 | Li et al. | |
| 8,462,632 B1 | 6/2013 | Vincent | |
| 8,468,251 B1 | 6/2013 | Pijewski et al. | |
| 2003/0223451 A1 | 12/2003 | Bi et al. | |
| 2006/0136276 A1* | 6/2006 | Schmitt | 705/7 |
| 2007/0169036 A1* | 7/2007 | Garner et al. | 717/143 |
| 2010/0077449 A1 | 3/2010 | Kwok et al. | |
| 2010/0325281 A1 | 12/2010 | Li et al. | |
| 2011/0065492 A1* | 3/2011 | Acres | 463/20 |
| 2011/0086690 A1* | 4/2011 | Acres | 463/16 |
| 2011/0265088 A1 | 10/2011 | Devadhar et al. | |
| 2012/0011518 A1 | 1/2012 | Duan et al. | |
| 2012/0066020 A1 | 3/2012 | Moon et al. | |
| 2012/0151063 A1 | 6/2012 | Yang et al. | |
| 2012/0215918 A1 | 8/2012 | Vasters et al. | |

(Continued)

OTHER PUBLICATIONS

Shue et al. "Fairness and Isolation in Multi-Tenant Storage as Optimization Decomposition," ACM SIGOPS Operating Systems Review, vol. 47, Issue 1, Jan. 2013. pp. 16-21.

(Continued)

*Primary Examiner* — Leland Marcus
(74) *Attorney, Agent, or Firm* — Fish & Richardson P.C.

(57) ABSTRACT

Methods, systems, and computer-readable storage media for selecting requests from a plurality of tenant queues in a multi-tenant system including actions of determining a plurality of weights, each weight being associated with a respective tenant in a set of tenants, each weight being dynamically adjusted based on a quota associated with the respective tenant for each iteration of a plurality of iterations within a period, selecting a tenant from the set of tenants based on the plurality of weights to provide a selected tenant, and transmitting a request from a request queue associated with the selected tenant for processing by a shared resource.

20 Claims, 5 Drawing Sheets

(56) References Cited

U.S. PATENT DOCUMENTS

| | | |
|---|---|---|
| 2012/0227044 A1* | 9/2012 | Arumugham et al. ........ 718/100 |
| 2012/0291088 A1 | 11/2012 | Srivastava et al. |
| 2013/0003538 A1* | 1/2013 | Greenberg et al. ........... 370/230 |
| 2013/0074091 A1 | 3/2013 | Xavier et al. |
| 2013/0085998 A1 | 4/2013 | Barker et al. |
| 2013/0124193 A1 | 5/2013 | Holmberg |
| 2013/0132404 A1 | 5/2013 | Liu et al. |
| 2013/0145006 A1 | 6/2013 | Tammam |
| 2013/0254407 A1 | 9/2013 | Pijewski et al. |
| 2014/0244879 A1* | 8/2014 | Myrah et al. ................. 710/300 |
| 2014/0258535 A1* | 9/2014 | Zhang .......................... 709/226 |

OTHER PUBLICATIONS

Chenyang Lu et al., "Feedback Control Architecture and Design Methodology for Service Delay Guarantees in Web Servers," IEEE Transactions on Parallel and Distributed Systems, vol. 17, No. 9, Sep. 2006, pp. 1014-1027.

Mehta, et al., U.S. Appl. No. 13/972,477, "Multi-Stage Feedback Controller for Prioritizing Tenants for Multi-Tenant Applications," Aug. 21, 2013, 24 pages.

* cited by examiner ns (12)
TENANT SELECTION IN QUOTA ENFORCING REQUEST ADMISSION MECHANISMS FOR SHARED APPLICATIONS

BACKGROUND

Infrastructures such as cloud computing infrastructures are based on sharing resources. The sharing principle can be beneficial on the software as a service (SaaS) level where, for example, a single application instance is shared among multiple groups of users. Such sharing enables significant cost reduction and maintenance efforts. This approach of sharing a single application instance is called multi-tenancy. Multi-tenancy can be described as a principle of delivering SaaS where a group of users, defined as one tenant, share a single application instance with other tenants, and each tenant has its own view onto the application, e.g., in both functional and non-functional aspects.

SUMMARY

Implementations of the present disclosure include computer-implemented methods for selecting requests from a plurality of tenant queues in a multi-tenant system. In some implementations, actions include determining a plurality of weights, each weight being associated with a respective tenant in a set of tenants, each weight being dynamically adjusted based on a quota associated with the respective tenant for each iteration of a plurality of iterations within a period, selecting a tenant from the set of tenants based on the plurality of weights to provide a selected tenant, and transmitting a request from a request queue associated with the selected tenant for processing by a shared resource.

In some implementations, actions further include identifying, from the plurality of tenants, tenants having non-empty request queues, and including the tenants having non-empty request queues in the set of tenants.

In some implementations, actions further include determining a plurality of weight ranges based on the plurality of weights, each weight range being associated with a respective tenant in the set of tenants, wherein selecting a tenant from the set of tenants is executed based on the plurality of weight ranges.

In some implementations, actions further include normalizing weights in the plurality of weights, such that a sum of the weights in the plurality of weights is equal to 1.

In some implementations, selecting a tenant from the set of tenants includes generating a random number and selecting a tenant based on the random number and the plurality of weight ranges.

In some implementations, the selected tenant is associated with a weight range, the random number falling within the weight range.

In some implementations, each weight range is determined based on a total number of requests in request queues associated with tenants in the set of tenants.

In some implementations, actions further include, in response to transmitting a request from a request queue associated with the selected tenant for processing by a shared resource decrementing a quota associated with the selected tenant to provide a revised quota, wherein weights in a subsequent iteration are determined at least partially based on the revised quota.

In some implementations, actions further include determining a priority for each tenant in the set of tenants based on respective weights in the plurality of weights to provide a plurality of priorities, wherein selecting a tenant from the set of tenants is executed based on the plurality of priorities.

In some implementations, each priority is determined based on a respective weight and a respective request weight associated with the respective tenant.

In some implementations, the respective request weight is incremented in response to the respective tenant being the selected tenant.

In some implementations, a tenant having a lowest priority is selected as the selected tenant.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to an access mechanism for providing requests to an application in a multi-tenant system while providing performance isolation between tenants. More particularly, implementations of the present disclosure include an access mechanism that selects requests from multiple tenant queues based on weights assigned to each tenant. In some examples, a weight can be provided based on a weight from a previous iteration and errors in one or more metrics, e.g., response time, throughput. In some examples, a controller can provide initial weights at the beginning of a period. In some examples, an access mechanism can revise weights between iterations within the period, as discussed in further detail herein. In some examples, errors can be determined based on actual performance and agreed performance, e.g., as defined in an agreement, as discussed in further detail herein. In some implementations, probabilistic selection can be provided, in which the access mechanism selects a random number between a pre-defined range, e.g., between 0 and 1, and maps the random number to a particular weight range assigned to different tenants based on their respective weights. In some examples, a tenant with a higher weight has larger weight range, and hence a higher probability of getting its request processed. In some implementations, priority-based selection can be provided, in which respective priorities are determined based on weights, and a tenant is selected based on priority. Using an access mechanism provided in the present disclosure, the sequential access of the different queues is eliminated. In some implementations, each time a tenant is selected, its weight is adjusted. In this manner, the probability and/or priority for selection of a given tenant continuously decreases as a result of requests for the tenant being processed.

Figure 1:
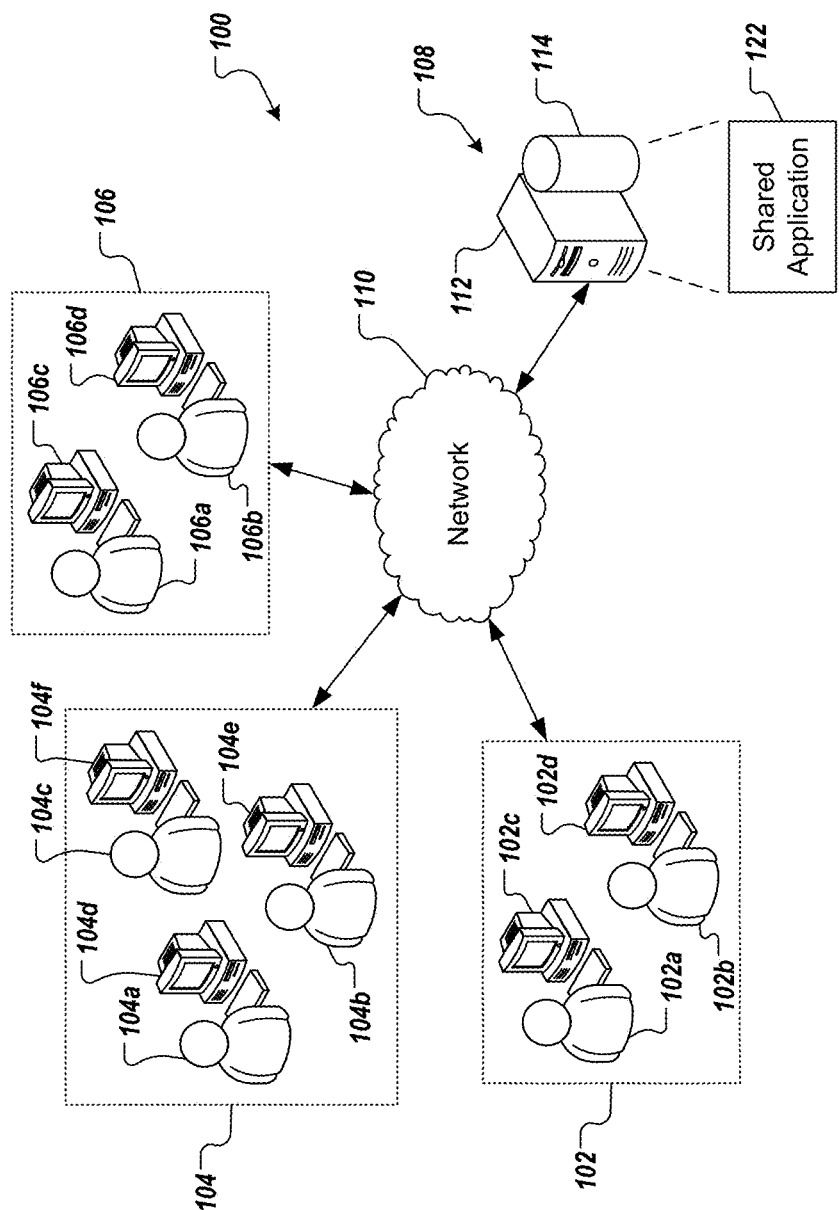
FIG. 1 depicts an example high-level architecture in accordance with implementations of the present disclosure.

FIG. 1 depicts an example architecture 100 in accordance with implementations of the present disclosure. The example architecture 100 is provided as a multi-tenant architecture and includes tenants 102, 104, 106 that communicate with a server system 108 over a network 110. In some examples, each tenant 102, 104, 106 includes multiple users 102a, 102b; 104a, 104b, 104c; 106a, 106b that use respective computing devices 102c, 102d; 104d, 104e, 104f; 106c, 106d to access the server system 108. In some examples, the computing devices 102c, 102d; 104d, 104e, 104f; 106c, 106d can be computing devices such as laptop computers, desktop computers, smartphones, personal digital assistants, portable media players, tablet computers, or other appropriate computing devices that can be used to communicate with the server system 108. In some implementations, the server system 108 can include one or more computing devices such as a computer server 112 and one or more databases 114. In some implementations, the network 110 can be a public communication network (e.g., the Internet, cellular data network, dialup modems over a telephone network) or a private communications network (e.g., private LAN, leased lines).

In accordance with implementations of the present disclosure, the server system 108 can be an application server system that executes a shared application 122. In the context of a multi-tenant architecture, an instance of the shared application 122 is shared by the tenants 102, 104, 106, e.g., the computing devices 102c, 102d; 104d, 104e, 104f; 106c, 106d. Accordingly, an application server instance shared by multiple tenants, where each tenant is provided with a dedicated share of the instance, which is isolated from other shares with regard to performance and data privacy.

As discussed in further detail herein, implementations of the present disclosure provide performance isolation such that the use of the shared application 122 by a tenant does not influence the performance, e.g., quality of service (QoS), experienced by other tenants. More particularly, the respective QoS given to each tenant can be defined based on a service level agreement (SLA) between a tenant and the service provider. Implementations of the present disclosure enable different QoSs to be provided to different tenants. More particularly, a SLA is a contract between a tenant and a service provider and can define conditions of usage, QoS, and the like. Accordingly, metrics for SLA can be provided.

Example metrics can include tenant quota, average response time, and throughput. In some examples, tenant quota (denoted as $\lambda_{SLAi}$ for the tenant $T_i$, is the number of request the tenant $T_i$ is allowed to send per unit of time, e.g., 1 second, in order to have a guaranteed QoS. In some examples, the average response time (denoted as $R_{SLAi}$ for the tenant $T_i$) is the average time taken by the server system to process a tenant request. In some examples, the response time is measured at the server system. In some examples, for each tenant, a guarantee for the average response time is given in the SLA as long as the tenant stays with in its workload quota. In some examples, throughput (denoted as $X_i$ for the tenant $T_i$) is the number of requests served for each tenant per unit of time, e.g., 1 second.

Figure 2:
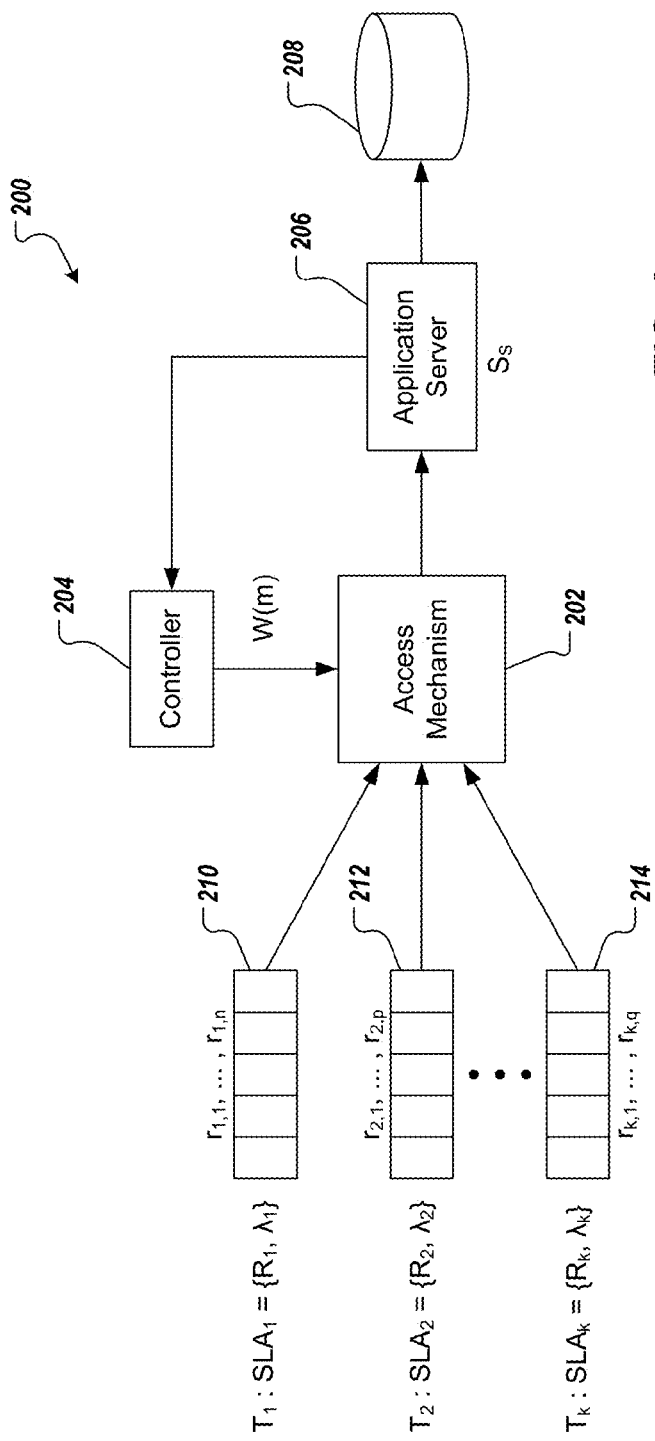
FIG. 2 depicts a block diagram of a conceptual architecture in accordance with implementations of the present disclosure.

Implementations of the present disclosure will be discussed in further detail herein with reference to an example context. In the example context, three tenants access a shared application hosted on an application server. It is appreciated, however, that implementations of the present disclosure are applicable in other appropriate contexts, e.g., contexts including fewer tenants, contexts including more tenants. Implementations of the present disclosure will also be discussed in further detail based on the following notations:

S server capacity, e.g., the number of application server threads available for processing tenant requests T T={$T_1$, . . . , $T_k$} is the set of tenants TQ TQ={$TQ_1$, . . . , $TQ_k$} is the set of tenant queues for the respective tenants in T $r_{i,j}$ the $j^{th}$ request from $TQ_i$ of tenant $T_i$ $R_i$ the average response time for tenant $T_i$ $\lambda_i$ the quota provided as the maximum number of requests that can be processed for tenant $T_i$ per unit time, e.g., 1 second, according to $SLA_i$ W W={$W_1$, . . . , $W_k$} is the set of weights associated with the respective tenant queues for a given period $R_{SLAi}$ the agreed upon (or expected), e.g., per a SLA, average response time for tenant $T_i$ FIG. 2 depicts a block diagram of a conceptual architecture 200 in accordance with implementations of the present disclosure. In the depicted example, the conceptual architecture 200 includes an access mechanism 202, a controller 204, an application server 206, and a database 208. In the depicted example, tenants $T_1$, . . . , $T_k$ are also provided, and include respective request queues 210, 212, 214. In the example context provided above, k is equal to 3. Each queue 210, 212, 214 queues respective requests $r_1, r_2, \ldots, r_k$ that are to be processed by the application server 206.

In accordance with implementations of the present disclosure, the access mechanism 202 selects requests from the respective request queues 210, 212, 214 for processing by the application server 206. In some examples, processing of a request can include accessing the database 208. In some examples, the application server 206 provides responses based on processed requests, e.g., responses are provided back to requesting tenants. In some examples, as discussed in further detail herein, the application server 206 provides feedback to the controller 204. In some examples, the feedback includes throughput and average response time for processed requests. In some examples, the controller 204 provides weights for each iteration of request selection during the pre-defined time period.

In accordance with implementations of the present disclosure, the access mechanism 202 selects requests for processing based on weights associated with the respective tenants $T_1, \ldots, T_k$. In some examples, the access mechanism 202 selects requests during a defined time period, e.g., 1 second. For example, multiple iterations of request selection can be performed during the defined time period. In some examples, the weights associated with the respective tenants $T_1, \ldots, T_k$ are dynamic during the time period. In some examples, the weights can be determined for each iteration during the defined time period. For example, a weight associated with a particular tenant can be reduced and weights associated with other tenants can be increased for request selection in a subsequent time period in response to selection of a request for the particular tenant in a current time period.

Figure 3:
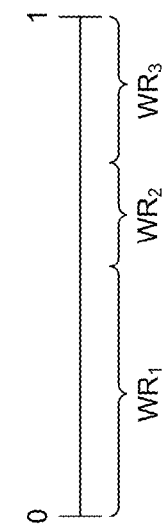
FIG. 3 depicts example weight ranges.

In some implementations, each tenant is assigned a respective value range, or weight range ($WR_i$) based on a respective weight ($W_i$). In some examples, the weight range for each tenant is initialized based on weights assigned to each tenant queue. An example weight range for a tenant i can be provided as:

$$WR_i = [a_i \text{ to } b_i]$$

which indicates that the weight range of tenant $T_i$ ranges from a value $a_i$ to a value $b_i$. In some examples, the value $a_i$ is included in the weight range. In some examples, the value $b_i$ is excluded from the weight range. In some examples, weight ranges for a set of tenants are normalized such that the weight ranges of all the tenants lie between 0 and 1. For example, FIG. 3 depicts example weight ranges $WR_1$, $WR_2$, $WR_3$ for respective tenants $T_1$, $T_2$, $T_3$, in the example context provided above.

In some implementations, a random number n is generated. In some examples, the random number n has a value between 0 and 1. In some examples, the value can include 0. In some examples, the value can include 1. In some implementations, the weight range that the random number n falls within is determined, and the tenant queue of the tenant associated with the identified weight range is selected for request processing. For example, an example random number n can be provided as 0.79, and an example weight range $WR_3$ for tenant $T_3$ is provided as [0.71 to 1]. In this example, the random number n lies within the example weight range $WR_3$ for tenant $T_3$. Consequently, a request from the request queue of the tenant $T_3$ is selected for processing.

In some implementations, it can be determined that the queue associated with the selected tenant is empty. That is, the tenant queue associated with the selected tenant does not currently have a pending request during the period. In some examples, and in response to determining that the queue associated with the selected tenant is empty, the random number n can be re-generated and another selection can be made. In some examples, this can be repeated until a tenant with a non-empty tenant queue is selected. In some examples, and in response to determining that the queue associated with the selected tenant is empty, the weight ranges can be updated and another selection routine can be executed. In some examples, this can be repeated until a tenant with a non-empty tenant queue is selected.

In some implementations, tenants with non-empty request queues are identified prior to request selection. In some examples, only tenants with non-empty request queues are accounted for in the request selection process. In this manner, selection of a tenant having an empty queue can be avoided. In some implementations, tenants with non-empty request queues are identified prior to weight calculation, discussed in further detail below. In some examples, weights are only calculated for tenants with non-empty request queues are accounted for in the request selection process. In this manner, selection of a tenant having an empty queue can be avoided.

Once a tenant queue is selected the quota for the respective tenant is reduced by 1, respective weights for the tenants are updated, and a new weight range for each tenant is determined.

In general, and as discussed in further detail herein, requests are selected during a period. In some examples, each period includes multiple iterations, where a request is selected per iteration. In some implementations, at the beginning of a period the weights for the tenants can be initialized for the period. For example, the controller can provide the weights to the access mechanism at the beginning of a period. In some examples, a request can be selected based on the initial weights during a first iteration within the period. In some examples, requests can be selected based on revised weights during subsequent iterations within the period. In some examples, the access mechanism determines the revised weights for subsequent iterations m of request selection during the defined time period. An example weight determination can be made based on the following example factors:

$R_i(m)$ the measured average response time for tenant $T_i$ for the $m^{th}$ iteration $X_i(m)$ the measured throughput for tenant $T_i$ for the $m^{th}$ iteration $W_i(m)$ the weight assigned to tenant $T_i$ for the $m^{th}$ iteration $ER_i$ error in average response time for tenant $T_i$ $EX_i$ error in the throughput for tenant $T_i$ $W_v$ volunteer weight increase due to free resources R total of average response times, e.g., SLA response times, for all tenants In some examples, initial weights can be calculated based on feedback that can be used to determined the errors, e.g., the difference between the measured response time and the SLA-defined response time, the difference between the measured throughput and the SLA-defined throughput.

Accordingly, by determining weights for each period the closed workload behavior of the requests coming from different tenants can be controlled, e.g., by the controller 204. For example, and based on the discussion above, the controller 204 can receive the average response time and throughput per tenant of the last period as feedback from the application server 206, can calculate new weights for the next period, and provide the weights to the access mechanism for selecting requests from tenants during the period. In general, if the measured average response time $R_i$ for tenant $T_i$ is more than the average response time $R_{SLAi}$ and throughput is below the quota, the tenant control signal, i.e., weight $W_i$, is increased. If the measured average response time $R_i$ for tenant $T_i$ is more than the average response time $R_{SLAi}$ and throughput is above the quota, the tenant control signal is increased only if application server is underutilized and additional resources are available to give to the tenant. In this case, the tenant is sending more requests than it is allowed to send, e.g., per a respective SLA. Further, if every tenant has average response time under the SLAs, the weights are provided as a ratio of the of average response time SLA for each tenant, respectively.

In some implementations, the weight ranges WR are determined based on the respective weights. In some examples, for each iteration, the weights are normalized to provide normalized weights $w_{norm\_i}$. In some examples, the weights are normalized such that the sum of normalized weights for all tenants is equal to 1. In some examples, respective weight ranges are determined based on respective percentages that the normalized weights occupy of the range 0 to 1. For example, and with reference to FIG. 3, the normalized weight for tenant $T_1$ can be provided as 0.50, the normalized weight for tenant $T_2$ can be provided as 0.21, and the normalized weight for tenant $T_3$ can be provided as 0.29. Consequently, $WR_1$ can be provided as [0.00 to 0.50], $WR_2$ can be provided as [0.50 to 0.70], and $WR_3$ can be provided as [0.70 to 1].

In further detail, a set of tenants, for which weight ranges are to be determined can be defined. In some examples, the set includes tenants having a non-empty tenant queue, e.g., at least one request pending. In some examples, the total number of all requests all tenants are still allowed to send within the period is determined. The following example relationship is provided:

$$\text{Sum} = \Sigma Q_i \text{ where } i \text{ identifies } T_i \in \text{set of selected tenants}$$

indicating that Sum is provided as the sum of requests that can be sent in a period for all tenant that in the set. In some examples, an initial range boundary is provided as:

$$a_0 = 0.0$$

For each tenant in the set, respective weight range boundaries, i.e., $a_i$, $b_i$, can be provided based on the following example relationships:

$$a_i = b_{i-1}, \quad b_i = a_i + Q_i/\text{Sum}$$

Accordingly, weight ranges for each tenant in the set are provided and can be used to select requests for processing based on the random number n, as discussed in detail herein.

In some implementations, $Q_i$ can be provided such that it cannot be less than 1. In this manner, tenants that may have exceeded their quote can still be allowed to send requests. In this manner, all tenants that have exceeded their quota will have the same probability of being selected, if no other tenant, e.g., tenants that have not exceeded their quotas, has pending requests. In some implementations, $Q_i$ can become negative, e.g., as a tenant exceeds its quota, and tenants having negative $Q_i$ can be ignored in the request selection, if any other tenant having a positive $Q_i$ has pending requests. If no other tenants have pending requests, the tenants with negative Qi can be considered.

In accordance with implementations of the present disclosure, the tenant having more requests that are processed will have an increasingly narrower weight range, and hence less probability of getting selected for processing as compared to a tenant with broader weight range. In this manner, fair share scheduling and convergence to defined quotas are provided.

Figure 4:
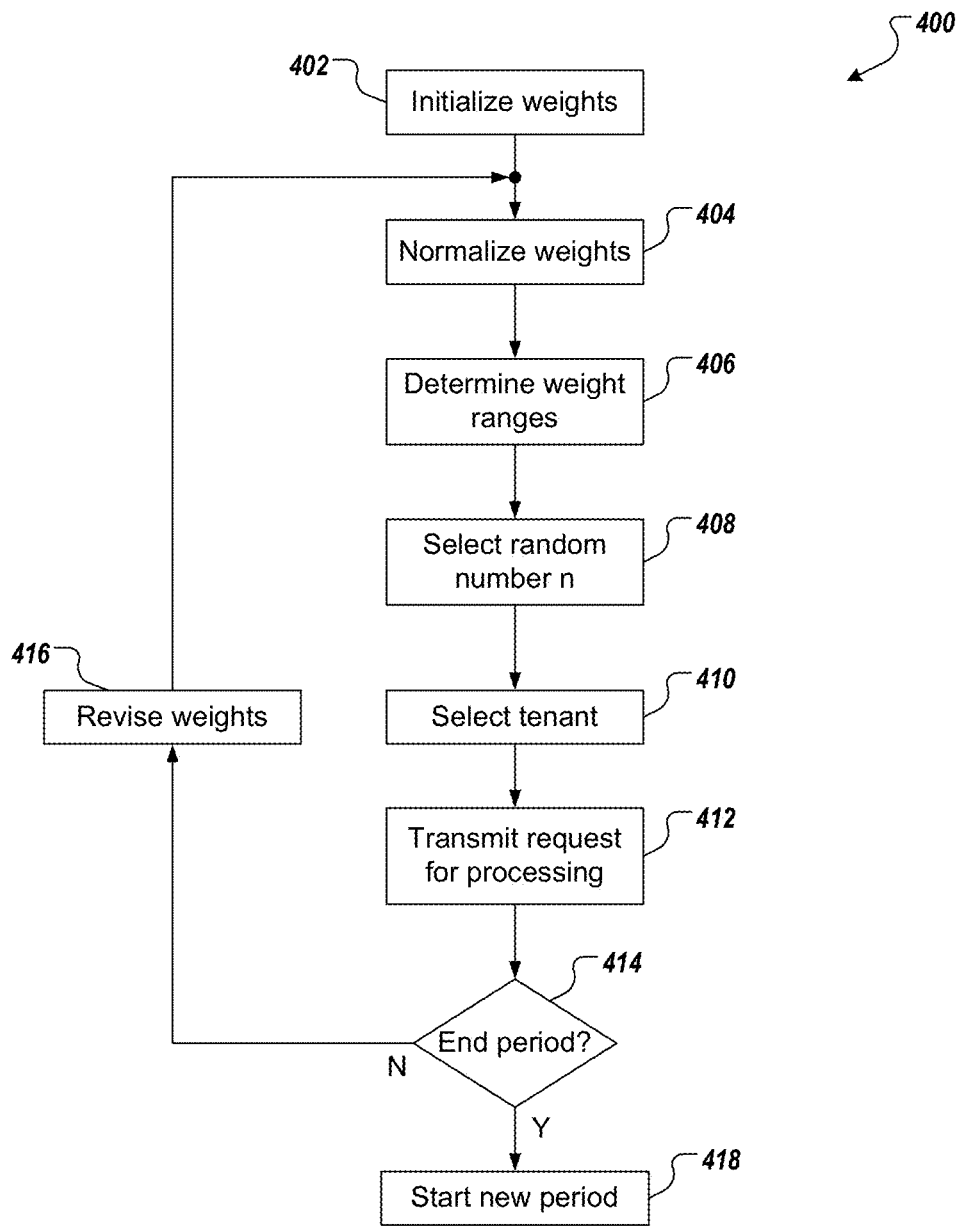
FIG. 4 depicts an example process that can be executed in accordance with implementations of the present disclosure.

FIG. 4 depicts an example process 400 that can be executed in accordance with implementations of the present disclosure. In some examples, the example process 400 can be provided as one or more computer-executable programs executed using one or more computing devices. In some examples, the example process 400 can represent actions executed at each iteration during a period.

Weights are initialized (402). In some examples, and at the outset of a first iteration of a period, weights for each tenant, or for tenants having a non-empty queue, are determined, e.g., as discussed herein. The weights are normalized (404). For example, the weights are normalized, such that the sum of all weights is equal to 1. Weight ranges are determined (406). For example, weight ranges for respective tenants are determined based on the normalized weights, as discussed in detail herein. A random number n is selected (408). In some examples, the random number n is within the range of 0 to 1. A tenant is selected (410). For example, the random number n is compared to each of the weight ranges, the weight range within which the random number n lies is identified, and the tenant corresponding to the weight range is selected. A request is transmitted for processing (412). For example, a request from the tenant queue associated with the selected tenant is provided to the shared resource for processing.

It is determined whether the period has ended (414). If it is determined that the period has not ended, the weights are revised (416) and the process 400 continues with the next iteration in the period. In some examples, weights are re-determined for tenants having non-empty tenant queues for the next iteration, as discussed in detail herein. If it is determined that the period has ended, a new period is started (418).

In some implementations, each tenant can be assigned a priority P based on a respective weight. In some examples, tenants are selected based on the priorities. More particularly, at the beginning of each period, weights W, associated with the respective tenants can be initialized, e.g., set to initial values for the period as discussed above, and a request weight $RW_i$ for each tenant can be initialized, e.g., set to zero. In some examples, for each iteration m within the period, tenants having non-empty queues can be included in the request selection process. A priority is determined for each of the tenants. In some examples, priorities are determined based on the following example relationship:

$$P_i = RW_i/W_i$$

Consequently, a set of priorities can be provided for the current iteration. In some examples, the tenant with the lowest priority is identified, a request is selected from the request queue associated with that tenant, and the request weight $RW_i$ associated with that tenant is incremented, e.g., increased by 1. Within a period, the request weights are carried over from iteration-to-iteration. In this manner, the more often a tenant is selected within the period, the higher that tenant's priority value becomes, e.g., because $RW_i$ increases each time the tenant is selected, and the less often the tenant will again be selected in subsequent iterations during the period.

Figure 5:
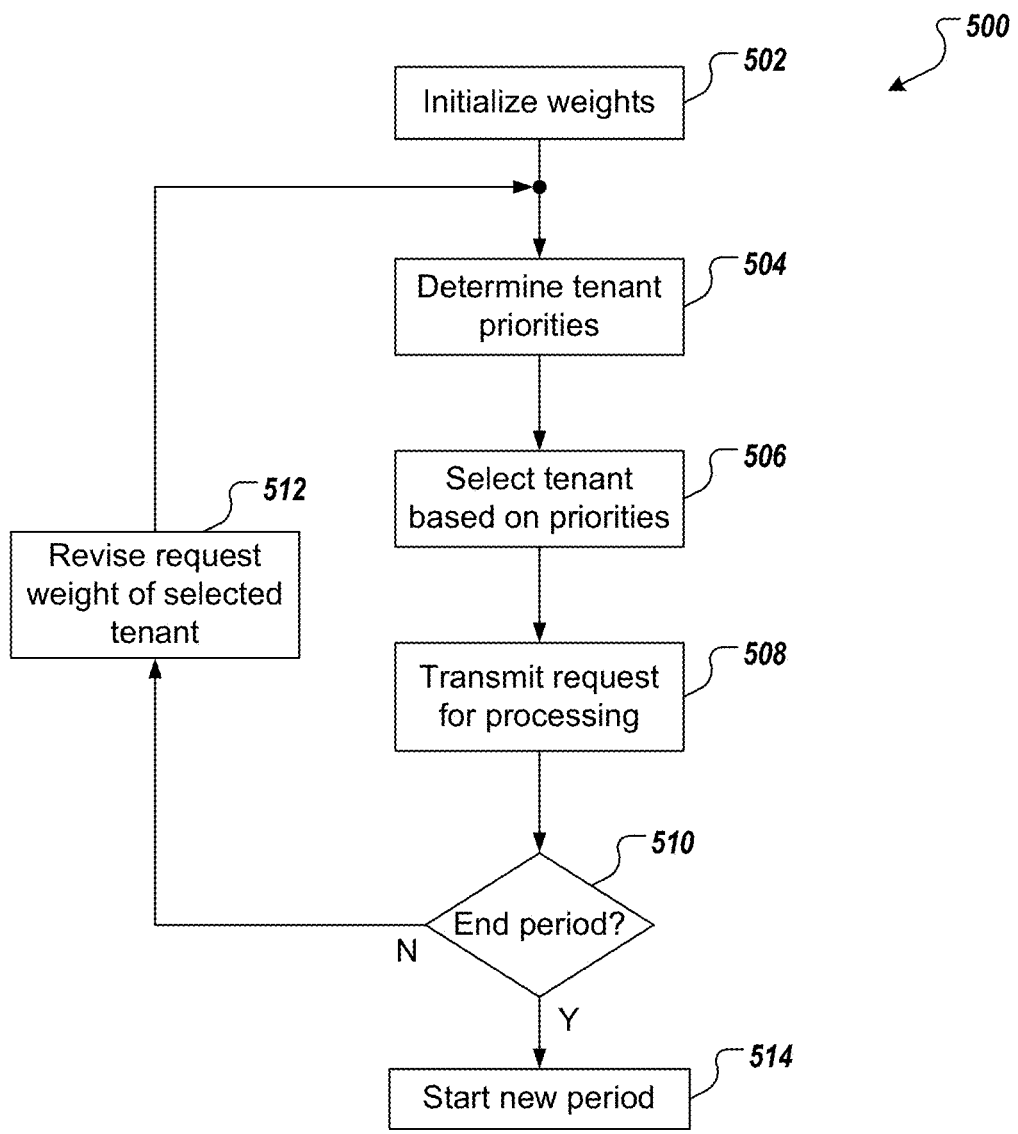
FIG. 5 depicts an example process that can be executed in accordance with implementations of the present disclosure.

FIG. 5 depicts an example process 500 that can be executed in accordance with implementations of the present disclosure. In some examples, the example process 500 can be provided as one or more computer-executable programs executed using one or more computing devices. In some examples, the example process 500 can represent actions executed at each iteration during a period.

Weights are initialized (502). In some examples, and at the outset of a first iteration of a period, weights for each tenant, or for tenants having a non-empty queue, are determined, e.g., as discussed herein. Tenant priorities are determined (504). For example, tenant priorities are determined based on respective request weights and weights, as discussed herein. A tenant is selected based on the priorities (506). For example, the tenant having the lowest priority value is selected. A request is transmitted for processing (508). For example, a request from the tenant queue associated with the selected tenant is provided to the shared resource for processing.

It is determined whether the period has ended (510). If it is determined that the period has not ended, the request weight associated with the select tenant is revised (512) and the process 500 continues with the next iteration in the period. In some examples, the request weight is incremented, as discussed in detail herein. If it is determined that the period has ended, a new period is started (514).

Figure 6:
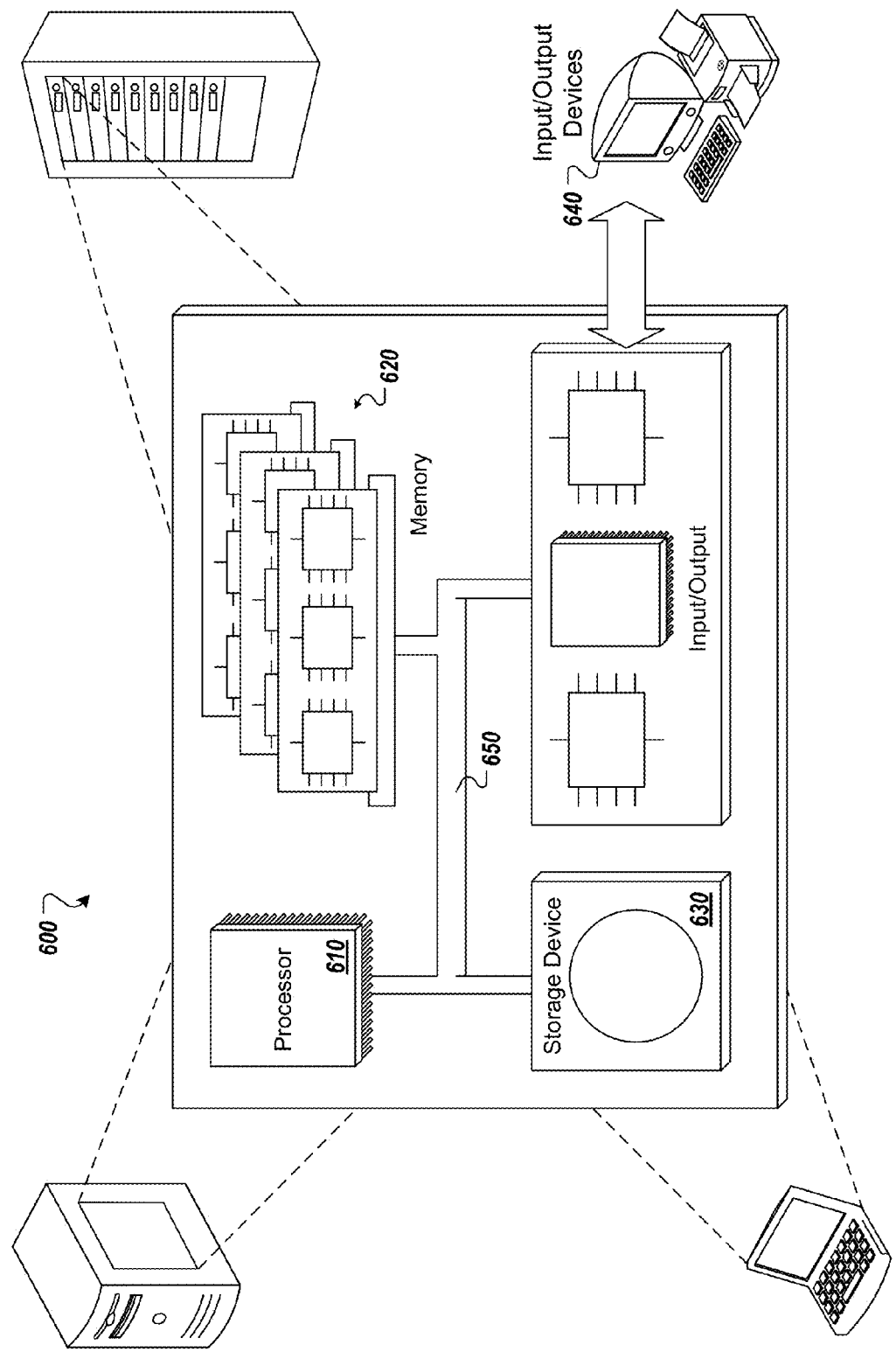
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 800. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selecting requests from a plurality of tenant queues in a multi-tenant system, the method being executed using one or more processors and comprising:

determining, by the one or more processors, a plurality of weights based on an initial set of weights provided at a beginning of a period, each weight being associated with a respective tenant in a set of tenants that share an application server instance executed by the multi-tenant system, which comprises an application server system;

receiving, by the one or more processors, a measured average response time and a measured throughput for each tenant in the set of tenants;

determining, by the one or more processors, a total of average response times for all tenants, an average response time error for the respective tenant, and a throughput error for the respective tenant based on the measured average response time, the measured throughput and a service level agreement that defines an average response time to process a quota comprising a maximum number of requests the respective tenant is allowed to send during each iteration to have a guaranteed quality of service;

dynamically adjusting, by the one or more processors, each weight based on the average response time error, the throughput error for the respective tenant, and the total of average response times for all tenants;

selecting, by the one or more processors, a tenant from the set of tenants based on the plurality of weights to provide a selected tenant; and transmitting, by the one or more processors, a request from a request queue associated with the selected tenant for processing by a dedicated shared resource, which is isolated from other dedicated shared resources, associated with other tenants within the multi-tenant system, with regard to performance and data privacy.

2. The method of claim 1, further comprising:
identifying, from the plurality of tenants, tenants having non-empty request queues; and
including the tenants having non-empty request queues in the set of tenants.

3. The method of claim 1, further comprising determining a plurality of weight ranges based on the plurality of weights, each weight range being associated with a respective tenant in the set of tenants, wherein selecting a tenant from the set of tenants is executed based on the plurality of weight ranges.

4. The method of claim 3, further comprising normalizing weights in the plurality of weights, such that a sum of the weights in the plurality of weights is equal to 1.

5. The method of claim 3, wherein selecting a tenant from the set of tenants comprises generating a random number and selecting a tenant based on the random number and the plurality of weight ranges.

6. The method of claim 5, wherein the selected tenant is associated with a weight range, the random number falling within the weight range.

7. The method of claim 3, wherein each weight range is determined based on a total number of requests in request queues associated with tenants in the set of tenants.

8. The method of claim 1, further comprising, in response to transmitting a request from a request queue associated with the selected tenant for processing by a shared resource:
decrementing a quota associated with the selected tenant to provide a revised quota, wherein weights in a subsequent iteration are determined at least partially based on the revised quota.

9. The method of claim 1, further comprising determining a priority for each tenant in the set of tenants based on respective weights in the plurality of weights to provide a plurality of priorities, wherein selecting a tenant from the set of tenants is executed based on the plurality of priorities.

10. The method of claim 9, wherein each priority is determined based on a respective weight and a respective request weight associated with the respective tenant.

11. The method of claim 10, wherein the respective request weight is incremented in response to the respective tenant being the selected tenant.

12. The method of claim 9, wherein a tenant having a lowest priority is selected as the selected tenant.

13. A non-transitory computer-readable storage medium coupled to one or more processors and having instructions stored thereon which, when executed by the one or more processors, cause the one or more processors to perform operations for selecting requests from a plurality of tenant queues in a multi-tenant system, the operations comprising:
determining a plurality of weights based on an initial set of weights provided at a beginning of a period, each weight being associated with a respective tenant in a set of tenants that share an application server instance executed by the multi-tenant system, which comprises an application server system;
receiving a measured average response time and a measured throughput for each tenant in the set of tenants;
determining a total of average response times for all tenants, an average response time error for the respective tenant, and a throughput error for the respective tenant based on the measured average response time, the measured throughput and a service level agreement that defines an average response time to process a quota comprising a maximum number of requests the respective tenant is allowed to send during each iteration to have a guaranteed quality of service;
dynamically adjusting each weight based on the average response time error, the throughput error for the respective tenant, and the total of average response times for all tenants;
selecting a tenant from the set of tenants based on the plurality of weights to provide a selected tenant; and
transmitting a request from a request queue associated with the selected tenant for processing by a dedicated shared resource, which is isolated from other dedicated shared resources, associated with other tenants within the multi-tenant system, with regard to performance and data privacy.

14. The computer-readable storage medium of claim 13, wherein operations further comprise determining a plurality of weight ranges based on the plurality of weights, each weight range being associated with a respective tenant in the set of tenants, wherein selecting a tenant from the set of tenants is executed based on the plurality of weight ranges.

15. The computer-readable storage medium of claim 13, wherein operations further comprise, in response to transmitting a request from a request queue associated with the selected tenant for processing by a shared resource:
decrementing a quota associated with the selected tenant to provide a revised quota, wherein weights in a subsequent iteration are determined at least partially based on the revised quota.

16. The computer-readable storage medium of claim 13, wherein operations further comprise determining a priority for each tenant in the set of tenants based on respective weights in the plurality of weights to provide a plurality of priorities, wherein selecting a tenant from the set of tenants is executed based on the plurality of priorities.

17. A system, comprising:
a computing device; and
a computer-readable storage device coupled to the computing device and having instructions stored thereon which, when executed by the computing device, cause the computing device to perform operations for selecting requests from a plurality of tenant queues in a multi-tenant system, the operations comprising:
determining a plurality of weights based on an initial set of weights provided at a beginning of a period, each weight being associated with a respective tenant in a set of tenants that share an application server instance executed by the multi-tenant system, which comprises an application server system;

receiving a measured average response time and a measured throughput for each tenant in the set of tenants;

determining a total of average response times for all tenants, an average response time error for the respective tenant, and a throughput error for the respective tenant based on the measured average response time, the measured throughput and a service level agreement that defines an average response time to process a quota comprising a maximum number of requests the respective tenant is allowed to send during each iteration to have a guaranteed quality of service;

dynamically adjusting each weight based on the average response time error, the throughput error for the respective tenant, and the total of average response times for all tenants;

selecting a tenant from the set of tenants based on the plurality of weights to provide a selected tenant; and transmitting a request from a request queue associated with the selected tenant for processing by a dedicated shared resource, which is isolated from other dedicated shared resources, associated with other tenants within the multi-tenant system, with regard to performance and data privacy.

18. The system of claim 17, wherein operations further comprise determining a plurality of weight ranges based on the plurality of weights, each weight range being associated with a respective tenant in the set of tenants, wherein selecting a tenant from the set of tenants is executed based on the plurality of weight ranges.

19. The system of claim 17, wherein operations further comprise, in response to transmitting a request from a request queue associated with the selected tenant for processing by a shared resource:
  decrementing a quota associated with the selected tenant to provide a revised quota, wherein weights in a subsequent iteration are determined at least partially based on the revised quota.

20. The system of claim 17, wherein operations further comprise determining a priority for each tenant in the set of tenants based on respective weights in the plurality of weights to provide a plurality of priorities, wherein selecting a tenant from the set of tenants is executed based on the plurality of priorities.

* * * * *